(12) United States Patent
Cho et al.

(10) Patent No.: US 7,899,120 B2
(45) Date of Patent: Mar. 1, 2011

(54) METHOD FOR SELECTING OUTPUT MOTION VECTOR BASED ON MOTION VECTOR REFINEMENT AND TRANSCODER USING THE SAME

(75) Inventors: Jin-Soo Cho, Gyeonggi-do (KR);
Jong-Woo Bae, Seoul (KR); Dong-Wan Seo, Seoul (KR); Yoon-Sik Choe, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1460 days.

(21) Appl. No.: 11/239,533

(22) Filed: Sep. 29, 2005

(65) Prior Publication Data
US 2006/0072666 A1 Apr. 6, 2006

(30) Foreign Application Priority Data
Oct. 2, 2004 (KR) .................. 10-2004-0078534

(51) Int. Cl.
*H04N 11/02* (2006.01)
(52) U.S. Cl. .......................... 375/240.16; 375/240.01
(58) Field of Classification Search .......... 375/240–241, 375/240.16
See application file for complete search history.

(56) References Cited

U.S. PATENT DOCUMENTS

| | | | |
|---|---|---|---|
| 6,711,212 B1 * | 3/2004 | Lin | 375/240.24 |
| 7,180,944 B2 * | 2/2007 | Lin et al. | 375/240.16 |
| 2003/0016751 A1 * | 1/2003 | Vetro et al. | 375/240.16 |
| 2004/0013195 A1 * | 1/2004 | Panusopone et al. | 375/240.2 |
| 2005/0053138 A1 * | 3/2005 | Seo | 375/240.16 |
| 2005/0058201 A1 * | 3/2005 | Fernandes | 375/240.16 |
| 2005/0169377 A1 * | 8/2005 | Lin et al. | 375/240.16 |
| 2006/0072665 A1 * | 4/2006 | Cho et al. | 375/240.16 |
| 2006/0072666 A1 * | 4/2006 | Cho et al. | 375/240.16 |

FOREIGN PATENT DOCUMENTS

| | | |
|---|---|---|
| JP | 2000-092498 A | 3/2000 |
| JP | 2000-134629 A | 5/2000 |
| JP | 2000-201328 A | 7/2000 |
| KR | 10-2004-0009162 A | 1/2004 |

OTHER PUBLICATIONS

"Motion vector refinement for video downsampling in the DCT domain" Kwang-deok Seo; Jae-kyoon Kim; Signal Processing Letters, IEEE vol. 9 , Issue: 11 Publication Year: 2002 , pp. 356-359.*

* cited by examiner

*Primary Examiner* — Bhavesh M Mehta
*Assistant Examiner* — Sean Motsinger
(74) *Attorney, Agent, or Firm* — Myers Bigel Sibley & Sajovec, P.A.

(57) ABSTRACT

A method of estimating output motion vector includes generating a group of candidate motion vectors, selecting two or more reference vectors, variably establishing a search window, and estimating an output motion vector by performing a motion vector refinement on the search window. The method selects the two or more reference vectors from the group of the candidate motion vectors and the search window is established according to a relativity among the reference vectors. A transcoder using the method includes an encoding parameter estimator configured to select the two or more reference vectors and to variably establish the search window according to the relativity between the reference vectors. Therefore, the search window may be efficiently established without increasing calculation time, so that the output motion vector may be more correctly estimated.

20 Claims, 6 Drawing Sheets

INPUT MACROBLOCKS                OUTPUT MACROBLOCK

US 7,899,120 B2

METHOD FOR SELECTING OUTPUT MOTION VECTOR BASED ON MOTION VECTOR REFINEMENT AND TRANSCODER USING THE SAME

CLAIM FOR PRIORITY

This application claims priority under 35 USC §119 to Korean Patent Application No. 2004-78534, filed on Oct. 2, 2004, the contents of which are herein incorporated by reference in their entirety for all purposes.

BACKGROUND OF THE INVENTION

1. Field of the Invention

The invention relates to a video transcoding method. The invention more particularly relates to a method for estimating an output motion vector for video transcoding and a transcoder using the method.

2. Description of the Related Art

A digital video system has significant advantages over an analog video system. For example, the digital video system may transmit or store information without distortion. The digital video system, however, needs a wide bandwidth for transmission and a vast storage due to videos having enormous amounts of information. Therefore, the drawbacks in digital video systems have been serious problems for video broadcasting, etc. through the Internet that has limited bandwidths.

Many efforts to reduce the bandwidth demands of digital signals, such as video stream signals, have been made, resulting in the development of compression technologies. A typical example is the MPEG-2 technology, which was defined by MPEG (Moving Picture Experts Group). MPEG-2 compresses video data remarkably by curtailing redundant information that exists considerably in a video stream.

In general, the MPEG coding process performs as follows. Video signals are sampled and quantized as chrominance elements and luminance elements of digital video pixels. The chrominance elements and luminance elements are stored as macroblock structures. The chrominance elements and the luminance elements stored in a macroblock are transformed to frequency coefficients through Discrete Cosine Transform (hereinafter referred to as DCT).

The MPEG encoding process focuses on the fact that the human optical system may not sense very well high-frequency elements of the variations of the chrominance elements and the luminance elements. Therefore, the high frequency DCT coefficients are relatively less precisely quantized. The quantized DCT coefficients are more compressed through a Run-Level Coding (RLC) and a Variable Length Coding (VLC).

The MPEG standards provide an additional compression by a motion compensation method. According to the MPEG standards, there are three types of pictures (of frames), that is, an I-frame, a P-frame, and a B-frame. The I-frame represents an Intra-coded frame and can be reconstructed without using a reference frame. Both the P-frame and the B-frame are inter-coded frames and can be reconstructed using reference frames. For example, both of the P-frame and the B-frame include motion vectors indicating motions with respect to a reference frame. The adoption of the motion vectors in MPEG greatly contributes to reducing the needed bandwidth, particularly for video streams, because adjacent frames in a video stream are likely to be very similar.

Recently, digital applications using compression methods such as MPEG-2 have been increasing. Transcoding methods, which convert one type of video stream with a particular bit rate into other types of video streams with different bit rates, have particularly been in demand due to various applications such as video searching, a picture in picture function, video joining, video editing, converting bit rates, with the bit streams being compressed. For example, a JPEG (Joint Photographic Experts Group) type bit stream could be converted into an MPEG bit stream, a DV (Digital Video) format that is a digital output of a digital camcorder could be converted into an MPEG bit stream, or a high quality HD (High Definition) MPEG bit stream could be converted into a low quality SD (Standard Definition) MPEG bit stream.

The transcoding algorithms are classified into spatial domain transcoding and DCT domain transcoding. In a transcoding process, a transcoder efficiently produces output parameters, which would be used later in coding processes, and performs the coding processes using the output parameters. Output parameter production algorithms focus mainly on classifying a type (or a mode) of an output macroblock and estimating output motion vectors, because the type of the output macroblock and the output motion vectors are very importantly used in the transcoding process.

When downsizing bit streams, such as converting a high quality HD MPEG bit stream into a low quality SD MPEG bit stream, there are roughly two kinds of downsizing, that is, an integer scaling and a non-integer scaling.

Particularly, as for the non-integer scaling that is different from the integer scaling, part of input macroblocks that overlap a correlation region correlated with an output macroblock, may each have different influences on the output macroblock, so that an output motion vector cannot be easily estimated.

As described as above, since the estimation of output motion vectors is not easy and affects the performance of the transcoder, a motion vector refinement process is needed. The refinement process for estimating the more correct output motion vectors is: first, to obtain a reference vector, and second, to perform refinement in an established search window centering on the reference vector.

It is very important to establish a proper search window in the refinement process. With too narrow a search window, the output motion vectors cannot be properly estimated in spite of the motion vector refinement process. Alternatively, with too wide a search window, the process would be very complex, need a longer estimation time due to more computation, and make embodiments of the transcoder difficult.

Therefore, to perform the motion vector refinement while establishing a proper search window, as well as reducing computation is a very important point in the output motion vector estimation.

SUMMARY OF THE INVENTION

Example embodiments of the present invention provide a method of estimating an output motion vector that performs a motion vector refinement by effectively establishing a search window.

Example embodiments of the present invention also provide a transcoder for estimating an output motion vector by effectively establishing a search window and by performing motion vector refinement in the search window.

Example embodiments of the present invention provide a method of estimating output motion vectors for a transcoding including, generating a group of candidate motion vectors by using a type of an output macroblock, selecting two or more reference vectors from the candidate motion vectors group, establishing a search window that varies according to a relativity among the reference vectors, and estimating an output motion vector by performing a motion vector refinement on the search window.

The reference vectors may be composed of a first reference vector and a second reference vector. The first reference vector may be selected by using a spatial weight and a block activity, and the second reference vector may be selected by using the spatial weight and the block activity among the candidate motion vectors group excluding the first reference vector.

The candidate motion vectors group may be generated by grouping motion vectors of input macroblocks whose types are equal to a type of the output macroblock.

The spatial weight may be related to the size of the overlapping region or to the number of pixels in the overlapping region where the input macroblocks overlap with the correlation region correlated with the output macroblock. The block activity may be related to or proportional to the number of the non-zero DCT coefficients in the input macroblocks.

The relativity means a degree that represents a relationship between the reference vectors. In some cases, the relativity may become larger for the high relationship. In other cases, the relativity may become larger for the low relationship.

The search window may be established more widely for the larger relativity and may be established as a wide search window for the larger relativity.

Example embodiments of the present invention also provide a transcoder including a decoder, a downsampler, an encoder, an information extractor, and an encoding parameter estimator. The decoder decodes an input stream encoded as a first format. The downsampler downsamples an output of the decoder. The encoder encodes an output of the downsampler as a second format. The information extractor is configured to extract information, from the decoder, which includes types of input macroblocks, input motion vector information, Discrete Cosine Transform (DCT) coefficients information, and information of an overlapping region where the input macroblocks overlap with a correlation region correlated to an output macroblock. The encoding parameter estimator is configured to establish a group of candidate motion vectors by using an output macroblock type and the information extracted by the information extractor, to select two or more reference vectors from the group of candidate motion vectors, to establish a search window that varies according to a relativity of the reference vectors, and to estimate an output motion vector by performing a motion vector refinement on the search window.

The group of the candidate motion vectors is generated by grouping the motion vectors of the input macroblocks whose types are equal to the type of the output macroblock. Further, the information extractor may extract other information besides the information described above.

The reference vectors are composed of a first reference vector and a second reference vector.

The spatial weight may be related to the size of the overlapping region or to the number of pixels in the overlapping region where the input macroblocks overlap with the correlation region correlated with the output macroblock. The block activity may be related to or proportional to the number of the non-zero DCT coefficients in the input macroblocks.

The relativity means a degree that represents a relationship between the reference vectors. In some cases, the relativity may become larger for the high relationship. In other cases, the relativity may become larger for the low relationship.

The search window may be established more widely for the larger relativity and may be established as a wide search window for the larger relativity.

The first format is a High Definition TV format and the second format is a Standard Definition TV format.

Therefore, the search window may be efficiently established without increasing calculation time, so that the output motion vector may be more correctly estimated.

DESCRIPTION OF EMBODIMENTS

Figure 1:
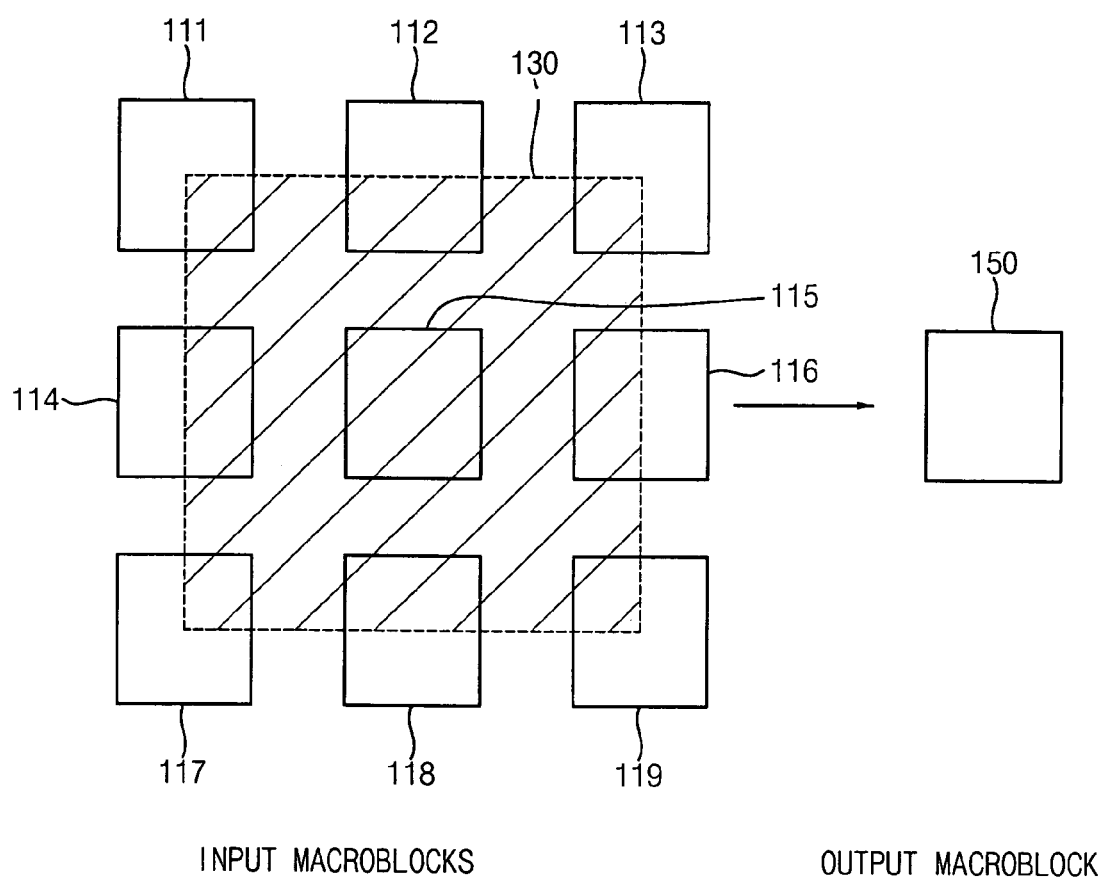
FIG. 1 is a diagram to illustrate an output motion vector estimation during a transcoding.

Detailed illustrative embodiments of the present invention are disclosed herein.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising, ", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a diagram to illustrate an output motion vector estimation during a transcoding.

Referring to FIG. 1, input macroblocks 111, 112, 113, 114, 115, 116, 117, 118, and 119, which overlap with a correlation region 130 correlated to an output macroblock 150, are transcoded into the output macroblock 150. The input macroblocks 111, 112, 113, 114, 115, 116, 117, 118, and 119 are, for example, an HDTV (High Definition TV) format data, and the output macroblock 150 is, for example, an SDTV (Standard Definition TV) format data. The correlation region 130 in FIG. 1 is mapped onto the output macroblock 150. The region 130 is called a mapped block.

A transcoding process includes a process to estimate an output motion vector from the input macroblocks 111, 112, 113, 114, 115, 116, 117, 118, and 119 in order to perform the transcoding process by using the estimated output motion vector.

For estimating the output motion vector, a group of candidate motion vectors is generated using a type of the output macroblock. The group of the candidate motion vectors is, for example, a set of motion vectors corresponding to some particular input macroblocks, among the input macroblocks, whose type is equal to the output macroblock type.

To estimate precisely the output motion vector of the output macroblock 150, two or more reference vectors are selected in the group of the candidate motion vectors. The two reference vectors may be composed of a first reference vector and a second reference vector.

Next, a search window is variably established according to a relativity between the selected reference vectors, and then, the output motion vector is estimated after performing the motion vector refinement on the search window. The motion vector refinement is a process to search a peripheral region of the reference vectors, for more precise estimation of the output motion vector. The motion vector refinement process is disclosed in "Motion Vector Refinement for High-Performance Transcoding", authored by J. Youn, M. T. Sun, and C. W. Lin, in IEEE Transactions on Multimedia Vol. 1, No. 1, published in March, 1999.

Figure 2:
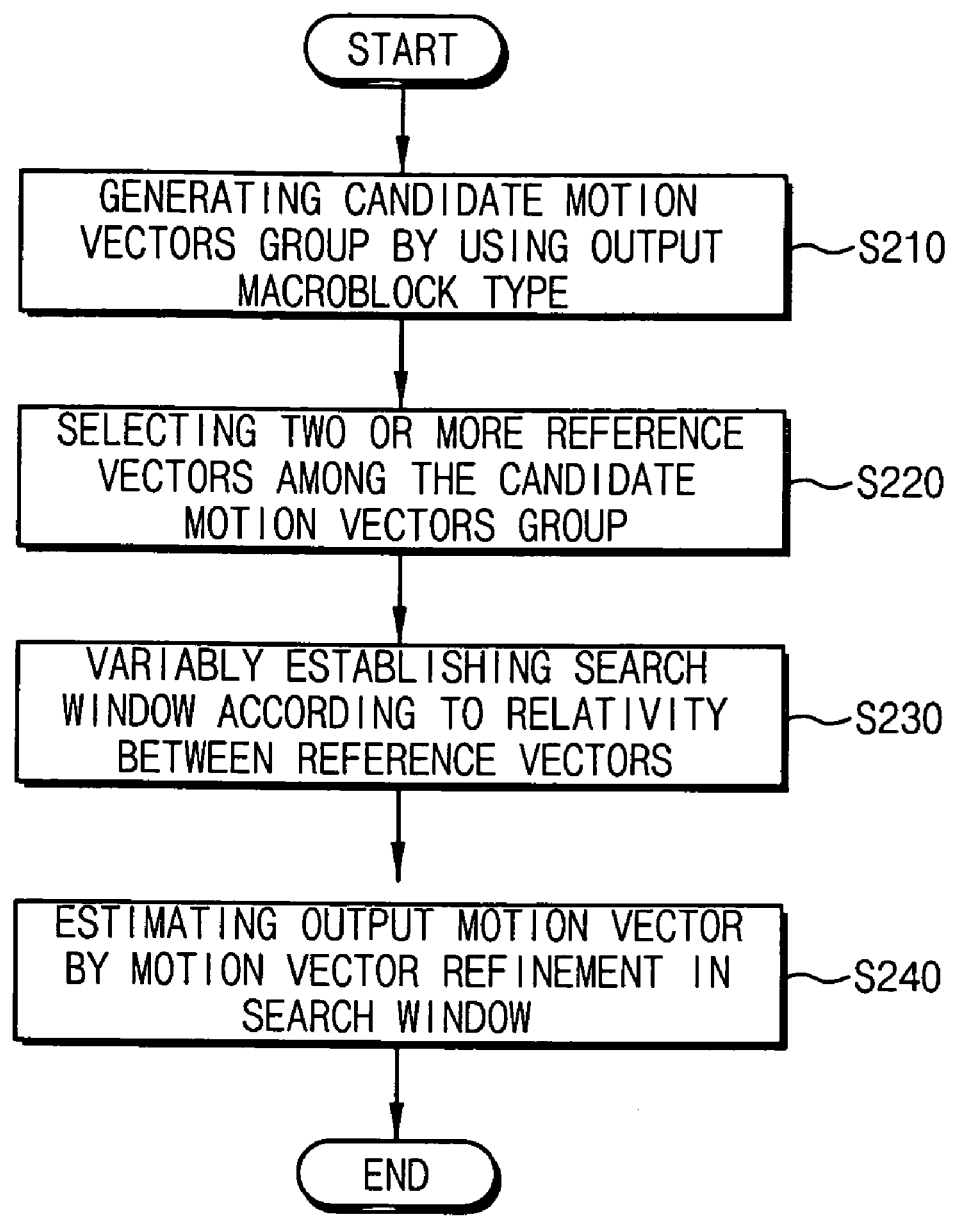
FIG. 2 is a flow chart to illustrate an output motion vector estimation according to an example embodiment of the present invention.

FIG. 2 is a flow chart to illustrate an output motion vector estimation according to an example embodiment of the invention.

Referring to FIG. 2, the output motion vector estimation begins with generating a group of candidate output vectors by using a type of an output macroblock (step S210). For example, the group of the candidate motion vectors may be generated by grouping some input macroblocks whose types are equal to a type of the output macroblock.

For instance, when the output macroblock is an inter type macroblock as well as a bottom field type macroblock, motion vectors of input macroblocks whose types are inter type as well as bottom type constitute the group of the candidate motion vectors. In this case, the input macroblocks have overlapping regions that overlap a correlation region, which is correlated with the output motion vector.

Next, two or more reference vectors are selected among the group of the candidate motion vectors (step S220). The two reference vectors may be composed of a first reference vector and a second reference vector.

The first reference vector may be selected by using a spatial weight, which is related to the correlation region, and a block activity, which is related to the number of non-zero Discrete Cosine Transform (DCT) coefficients. The spatial weight may be, for example, the number of pixels in overlapping regions where the input macroblocks overlap with the correlation region. The block activity may be, for example, proportional to the number of the non-zero DCT coefficients in the input macroblocks.

The second reference vector may be selected, among the group of candidate motion vectors excluding the first reference vector, by using the spatial weight and the block activity.

The first reference vector may be, for example, a first candidate motion vector, which minimizes a sum of products of the spatial weight and the block activity corresponding to the first candidate motion vector and each distance between the first candidate motion vector in the group of candidate motion vectors and each of the other candidate motion vectors in the group of candidate motion vectors excluding the first candidate motion vector.

The second reference vector may be, for example, a second candidate motion vector, which minimizes a sum of products of the spatial weight and the block activity corresponding to the second candidate motion vector and each distance between the second candidate motion vector in the group of candidate motion vectors excluding the first reference vector and each of the other candidate motion vectors in the group of candidate motion vectors excluding the first reference vector and the second candidate motion vector.

The estimation method, described as above, may be represented as following Equation 1.

$$d_i = \sum_{j=1, j \neq i}^{N} M_i \times A_i \times \|MV_i - MV_j\| \qquad <\text{Equation 1}>$$

(N: the number of the candidate motion vectors; $M_i$, $M_j$: the spatial weights; $A_i$, $A_j$: the block activities; $MV_i$, $MV_j$: the motion vectors belonging to the respective candidates group)

An $MV_i$ minimizing $d_i$ in the Equation 1 is the first reference vector. Among the candidate motion vectors excluding the first reference vector, an $MV_i$ minimizing $d_i$ in the Equation 1 is the second reference vector. Conventional estimation methods of output motion vectors select one reference vector, and establish a search window by the selected reference vector in order to perform the motion vector refinement process. Therefore, an improper reference vector, which results in an unsuitable search window, causes image quality degradation after transcoding. The improper reference vector doesn't represent a motion of all of the input macroblocks. In embodiments according to the invention, the output motion vector estimation method selects two or more reference vectors so as to establish the search window more properly than when one reference vector is selected.

Next, the search window is variably established according to a relativity between the selected reference vectors (step S230).

In case of two reference vectors, that is, the first reference vector and the second reference vector, the relativity may be proportional to a distance between the two reference vectors.

The relativity may be represented, for example, as following Equation 2.

$$R = \|MV_f - MV_s\|/2 \qquad \text{<Equation 2>}$$

(R: the relativity; $MV_f$: the first reference vector; $MV_s$: the second reference vector)

The search window may be established as wide or narrow in proportion to the relativity. For example, the smaller the relativity becomes, the narrower the search window is established, and the larger the relativity becomes, the wider the search window is established.

Since the relativity R in the Equation 2 is proportional to a distance between the first reference vector and the second reference vector, it is preferable to establish the search window widely for the large relativity. Because the larger R means the farther distance between the reference vectors, the motion vector refinement is necessarily performed on a wider region.

For instance, when the relativity R in Equation 2 is equal to zero, the search window may be established within a one-pixel perimeter around a pixel corresponding to the first reference vector. A relativity of zero means that the reference vector represents exactly a tendency of the motion vector of all of the input macroblocks.

When the relativity is larger than zero and smaller than two, the search window may be established within a one-pixel perimeter around a pixel corresponding to one reference vector that has a smaller sum of absolute differences (hereinafter referred to as SAD) between a reference frame and the reference vector.

When the relativity is equal to or larger than two, the search window may be established within a two-pixel perimeter around a pixel corresponding to one reference vector that has a smaller SAD.

When the relativity is larger than two, it is necessary to establish the wider search window, because the reference vector may not exactly represent a tendency of the motion vector of all of the input macroblocks. Too wide a search window, however, increases the complexity of the whole system, so the search window should be established with proper limits. A detailed definition of the sum of absolute differences SAD is presented within the above paper "Motion Vector Refinement for High-performance Transcoding".

Next, the output motion vector is estimated by performing the motion vector refinement on the established search window (step S240).

Figure 3A:
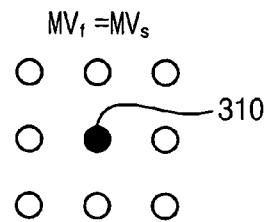
FIG. 3A, FIG. 3B and FIG. 3BC are diagrams to illustrate establishment of a search window in a motion vector estimation method according to an example embodiment of the present invention.
Figure 3B:
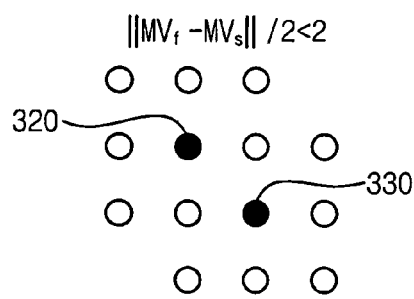
Figure 3C:
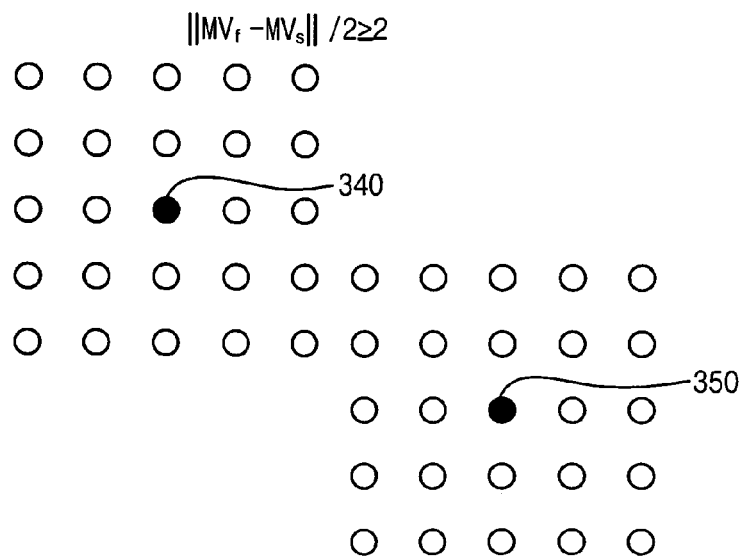

FIG. 3A, FIG. 3B and FIG. 3C are diagrams to illustrate establishment of a search window in motion vector estimation method according to an example embodiment of the invention. Referring to FIG. 3A, when the relativity R by the Equation 2 is zero, the search window is established within a one-pixel perimeter around a pixel 310 corresponding to the first reference vector $MV_f$. In this case, the first reference vector $MV_f$ and the second reference vector $MV_s$ are identical to each other, so the reference vector may exactly represent a tendency of the motion vector of all of the input macroblocks.

Referring to FIG. 3B, when the relativity R by the Equation 2 is larger than zero and smaller than two, the search window is established within a one-pixel perimeter around a pixel 320 corresponding to the first reference vector $MV_f$ or another pixel 330 corresponding to the second reference vector $MV_s$. In this case, the smaller SAD may determine whether the search window is established around the pixel 320 or the pixel 330. Compared with the reference vector in FIG. 3A, the reference vector in FIG. 3B may not properly represent a tendency of the motion vector, so the SAD is necessarily calculated on a more exactly established search window.

Referring to FIG. 3C, when the relativity R is equal to or larger than two, the search window is established within a two-pixel perimeter around a pixel 340 corresponding to the first reference vector $MV_f$ or another pixel 350 corresponding to the second reference vector $MV_s$. In this case, the smaller SAD may determine whether the search window is established around the pixel 340 or the pixel 350. Comparing with the reference vectors in FIG. 3A or in FIG. 3B, the reference vector in FIG. 3C may not properly represent a tendency of the motion vector, so the search window is established within a two-pixel perimeter around a pixel corresponding to one reference vector that has smaller SAD, after calculating the SADs. The perimeter of the search window has a limitation of two pixels, in order to avoid the complexity and to get an optimal result as well.

Figure 4:
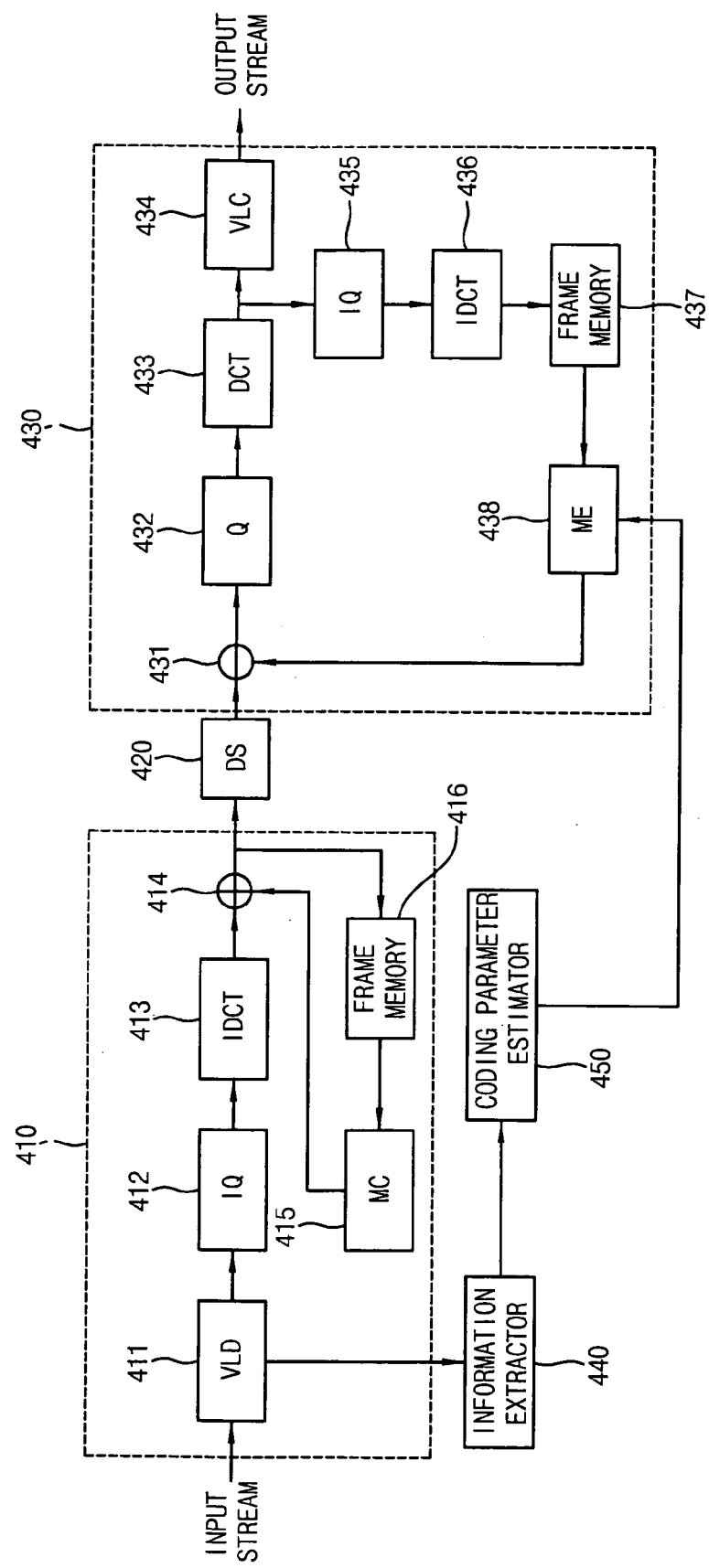
FIG. 4 is a block diagram to illustrate a transcoder according to an example embodiment of the present invention.

FIG. 4 is a block diagram to illustrate a transcoder according to an example embodiment of the invention.

Referring to FIG. 4, the transcoder 400 includes a decoder 410, a downsampler (DS) 420, a encoder 430, an information extractor 440, and an encoding parameter estimator 450.

The decoder 410 decodes an input stream, which is coded by a first format. The first format is, for example, an HDTV format. The decoder 410 includes a Variable Length Decoding (VLD) circuit 411, an Inverse Quantization (IQ) circuit 412, an Inverse Discrete Cosine Transform (IDCT) circuit 413, an adder 414, a Motion Compensation (MC) circuit 415, and a frame memory 416.

The VLD circuit 411 performs a variable length decoding process on the input stream. The IQ circuit 412 performs an inverse quantization on the variable length decoded input stream. The IDCT circuit 413 performs an inverse discrete cosine transform process on the inverse quantized data. The MC circuit 415 performs a motion compensation process by using an output of the adder 414, and outputs the motion compensated data to the adder 414. The adder 414 adds the inverse discrete cosine transformed data with the motion compensated data. The frame memory 416 stores the output of the adder 414.

The downsampler (DS) 420 performs a downsampling process on an output of the decoder 410.

The encoder 430 generates an output stream after coding the output of the downsampler 420 by a second format. The second format is, for example, an SDTV format.

The encoder 430 includes a subtracter 431, a Quantization (Q) circuit 432, a Discrete Cosine Transform (DCT) circuit 433, a Variable Length Coding (VLC) circuit 434, an Inverse Quantization (IQ) circuit 435, an Inverse Discrete Cosine Transform (IDCT) circuit 436, a frame memory 437, and a Motion Estimation (ME) circuit 438.

The subtracter 431 subtracts a motion estimated data (outputted from the ME circuit 438) from the output of the downsampler 420. The quantization circuit 432 quantizes an output of the subtracter 431. The DCT circuit 433 performs a discrete cosine transform process on the quantized data. The VLC circuit 434 performs a variable length coding process on the discrete cosine transformed data to generate an output stream. The IQ circuit 435 performs an inverse quantization process on the discrete cosine transformed data. The IDCT circuit 436 performs an inverse discrete cosine transform process on the inverse quantized data. The frame memory 437 stores an output of the IDCT circuit 436. The ME circuit 438 performs a motion estimation process by using an output of the frame memory 437 and generates a motion estimated data.

While the decoder 410 decodes the input stream, the information extractor 440 extracts types of input macroblocks, input motion vectors information, DCT coefficients information, and information of an overlapping region where the input macroblocks overlap with correlation regions correlated with output macroblocks. The information is used or generated in the decoder 410 during the decode process. Embodiments of the information extractor 440 would not be difficult for those skilled in the art, because hardware embodiments may be achieved by, for example, allocating additional output pins, and software embodiments may be achieved by, for example, adding additional software functions.

The information extractor 440 may extract other information. The information extractor 440 may extract information from the VLD circuit 411 in the decoder 410.

The encoding parameter estimator 450 generates a group of candidate motion vectors by using a type of the output macroblocks and the information extracted from the information extractor 440. The encoding parameter estimator 450 also selects two or more reference vectors from the group of the candidate motion vectors, and establishes a search window according to a relativity among the reference vectors, and estimates an output motion vector by performing a motion vector refinement on the search window.

Therefore, the encoder 430 can effectively perform a coding process by using the estimated output motion vector.

The estimated output motion vector may be implemented to be outputted to the ME circuit 438 in the encoder 430 or to both the ME circuit 438 and VLC circuit 434, or even to non-illustrated parts of the encoder 430 in FIG. 4.

Figure 5:
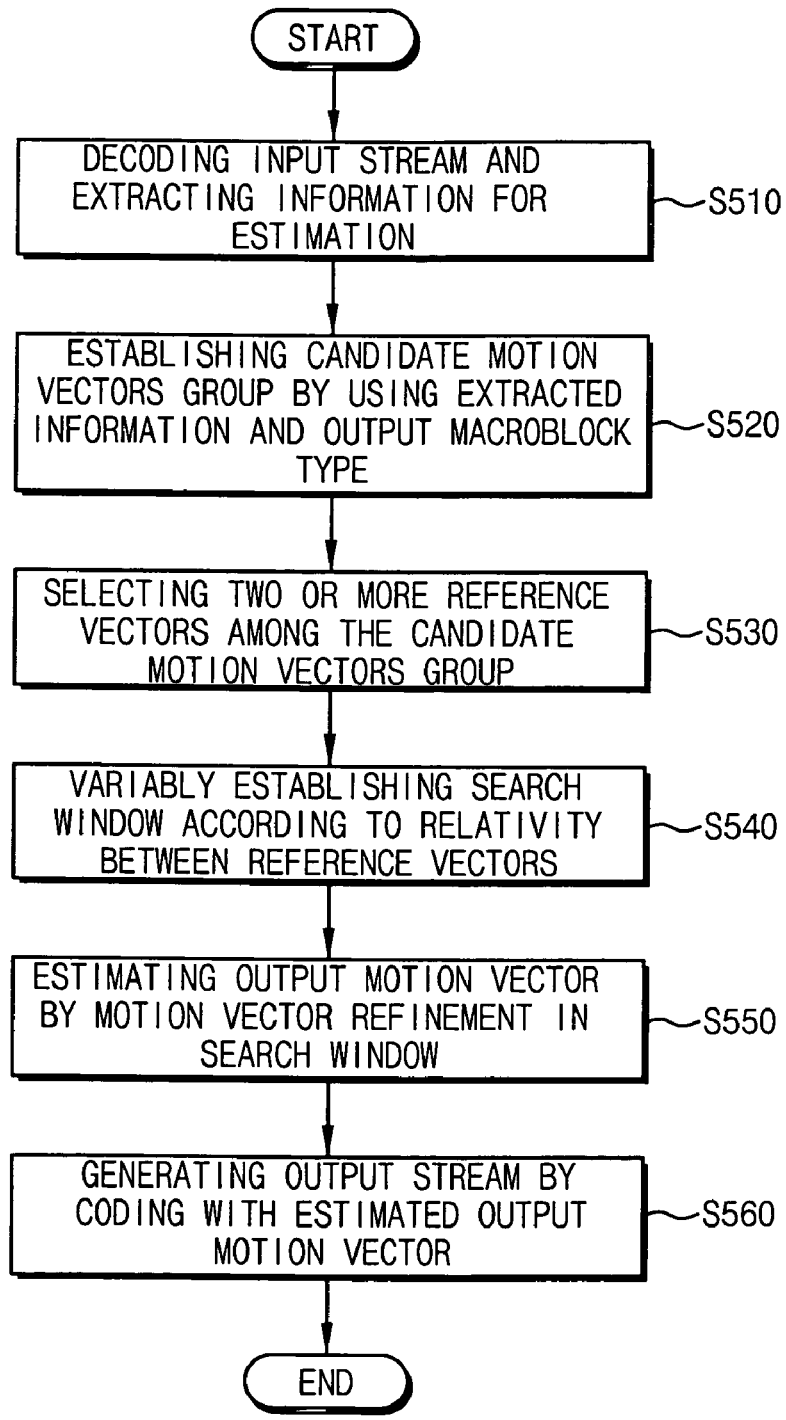
FIG. 5 is a flow chart to illustrate operation of the transcoder in FIG. 4.

FIG. 5 is a flow chart to illustrate operation of the transcoder in FIG. 4.

Referring to FIG. 5, the transcoder 400 in FIG. 4 first decodes an input stream, and extracts information that is needed for the estimation (step S510).

The transcoder extracts types of input macroblocks, input motion vector information, DCT coefficients information, and information of overlapping regions where the input macroblocks overlap with correlation regions correlated with output macroblocks. The input macroblock types mean, for example, an intra/inter type, a frame/field type or a prediction direction type, etc. of the input macroblocks. The input motion vector information is information about the motion vectors of the input macroblocks. The DCT coefficient information includes the number of non-zero DCT coefficients in each macroblock. The overlapping regions information relates to the size of the region overlapped with the correlation region that is correlated with the input macroblocks, and includes the number of pixels within the overlapped region.

Next, the transcoder 400 in FIG. 4 generates a group of candidate motion vectors by using the extracted information and a type of the output macroblock (step S520).

The output macroblock type may be externally provided, and estimated in the transcoder in FIG. 4. The group of the candidate motion vectors may be generated by grouping the motion vectors of the input macroblocks whose types are equal to the type of the output macroblock.

Next, the transcoder 400 in FIG. 4 selects two or more reference vectors among the group of the candidate motion vectors (step S530).

The two reference vectors may be comprised of a first reference vector and a second reference vector.

The first reference vector may be selected by using a spatial weight, which is related to the correlation region, and a block activity, which is related to the number of non-zero DCT coefficients. The spatial weight may be, for example, the number of pixels in an overlapping region where the input macroblocks overlap with the correlation region. The block activity may be, for example, proportional to the number of the non-zero DCT coefficients in the input macroblocks.

The second reference vector may be selected by using the spatial weight and the block activity, among the group of the candidate motion vectors excluding the first reference vector.

The first reference vector may be, for example, a first candidate motion vector, which minimizes a sum of products of spatial weight and block activity corresponding to the first candidate motion vector and each distance between the first candidate motion vector in the group of candidate motion vectors and each of the other candidate motion vectors in the group of candidate motion vectors excluding the first candidate motion vector.

The second reference vector may be, for example, a second candidate motion vector, which minimizes a sum of products of spatial weight and block activity corresponding to the second candidate motion vector and each distance between the second candidate motion vector in the group of candidate motion vectors excluding the first reference vector and each of the other candidate motion vectors in the group of the candidate motion vectors excluding the first reference vector and the second candidate motion vector.

Next, the transcoder 400 in FIG. 4 variably establishes a search window according to a relativity of the selected reference vectors (step S540).

In case of two reference vectors, that is, the first reference vector and the second reference vector, the relativity may be proportional to a distance between the two reference vectors. The relativity may be represented, for example, by the Equation 2.

The search window may be established as widely or narrowly in proportion to the relativity. For example, the narrower search window may be established for the smaller relativity, and the wider search window for the larger relativity.

Since the relativity R in the Equation 2 is proportional to a distance between the first reference vector and the second reference vector, it is preferable to establish the search window widely for the large relativity. Because the larger R means the farther distance between the reference vectors, the motion vector refinement is necessarily performed on a wider region.

For instance, when the relativity R in Equation 2 is equal to zero, the search window may be established within a one-pixel perimeter around a pixel corresponding to the first reference vector. A relativity of zero means that the reference vector represents exactly a tendency of the motion vector of the overall input macroblocks.

When the relativity R is larger than zero and smaller than two, the search window may be established within a one-pixel perimeter around a pixel corresponding to one reference vector that has a smaller SAD between a reference frame and the reference vector.

When the relativity R is equal to or larger than two, the search window may be established within a two-pixel perimeter around a pixel corresponding to one reference vector that has a smaller SAD.

Next, the transcoder in FIG. 4 estimates an output motion vector by performing the motion vector refinement on the established search window (step S550).

Next, the transcoder in FIG. 4 generates an output stream after performing a coding process by using the estimated output motion vector (step S560).

Figure 6:
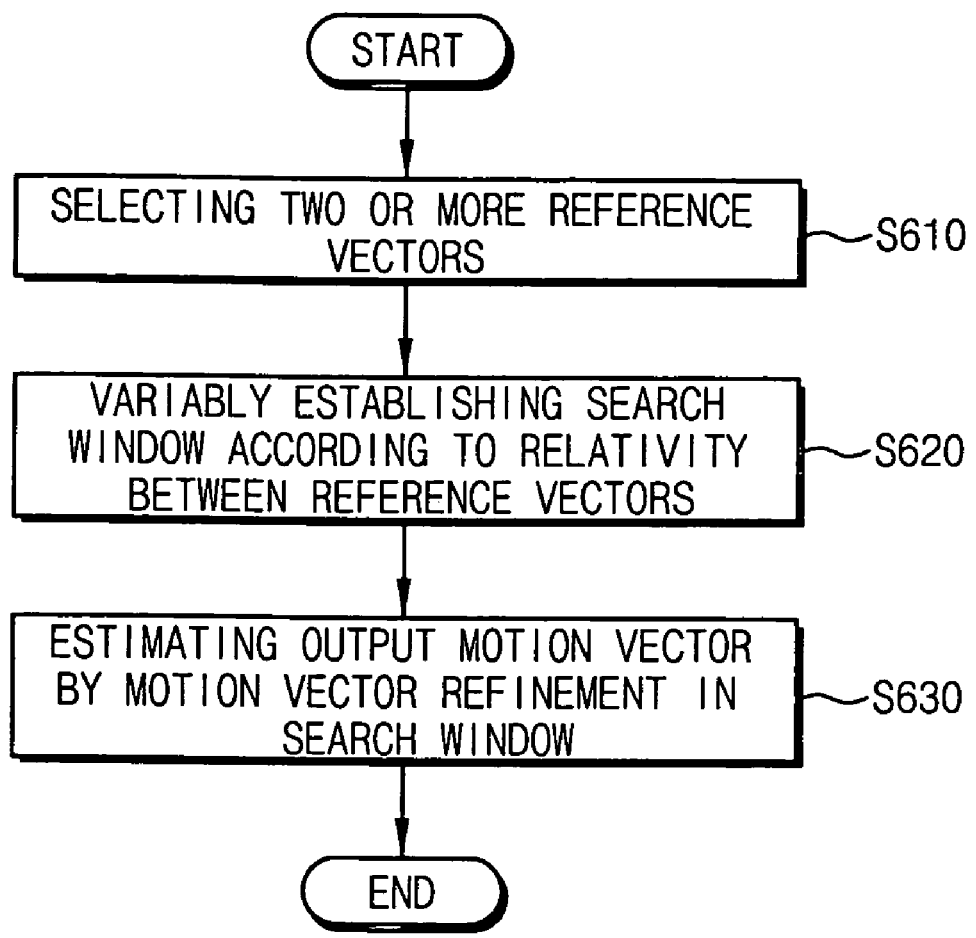
FIG. 6 is a flow chart to illustrate operation of an encoding parameter estimator in FIG. 4.

FIG. 6 is a flow chart to illustrate operation of an encoding parameter estimator in FIG. 4.

Referring to FIG. 6, the encoding parameter estimator, first, selects two or more reference vectors to estimate an output motion vector, after generating a group of candidate output vectors by using types of output macroblocks (step S610). For example, the group of the candidate motion vectors may be generated by grouping //some// input macroblocks whose types are equal to a type of the output macroblock. In this case, the step S210 in FIG. 2 may be adopted to generate the candidate motion vectors.

The two reference vectors may be composed of a first reference vector and a second reference vector. In this case, the step S220 in FIG. 2 may be adopted to select the reference vectors.

As to each of the macroblocks overlapped with correlation region, each of the spatial weights, related to the size of the overlapping regions in which each of the macroblocks overlaps with the correlation region, may be obtained from the information of each of the overlapping regions.

The block activity may be obtained by the number of non-zero DCT coefficients from the DCT coefficients information.

Next, the encoding parameter estimator establishes the search window that varies according to the relativity of the reference vectors (step S620).

When the reference vectors are composed of the first reference vector and the second reference vector, the relativity may be proportional to the distance between the two reference vectors.

The search window may be established as wide or narrow in proportion to the relativity. For example, the narrower search window may be established for the smaller relativity, and the wider search window for the larger relativity. Further, the step S230 in FIG. 2 may be adopted to establish the search window.

Next, the encoding parameter estimator estimates the output motion vector after performing the motion vector refinement on the established search window (step S630).

The output motion vector estimation method for the transcoding may be implemented by a computer program or an ASIC (Application-Specific Integrated Circuit) that uses an HDL (Hardware Description Language) based on an algorithm of the computer program.

The invention is not limited by the written embodiments, and as far as an embodiment uses the output motion vector estimation method described as in the appended claims, the embodiment would be within the perimeter of the invention.

Although the invention mainly describes the embodiments in which two reference vectors are selected for the output motion vector estimation method and the transcoding, selection of three or more reference vectors would be within the perimeter of the invention, as far as a relativity among the selected reference vectors is calculated and a search window is established according to the calculated relativity.

Additionally, although the invention mainly describes the embodiments in which the relativity is proportional to the distances between the reference vectors, establishing a search window would be within the perimeter of the invention, as far as the search window is variably established by using the relativity among the reference vectors.

The output motion vector estimation method and the transcoder according to the invention selects two or more reference vectors, and variably establishes the search window according to the relativity among the reference vectors, so that the search window could be efficiently established without increasing calculation time. Therefore, the output motion vector may be more correctly estimated because the motion vector refinement is more efficiently performed. As a result, the performance of the transcoder may be improved and may reduce the image quality degradation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of estimating an output motion vector for a transcoding, comprising:

generating a group of candidate motion vectors by using a type of an output macroblock;

selecting two or more reference vectors from the group of the candidate motion vectors;

variably establishing a search window that varies according to a relativity among the reference vectors; and estimating the output motion vector by performing a motion vector refinement on the search window, wherein the reference vectors are composed of a first reference vector and a second reference vector, wherein the group of the candidate motion vectors is generated by grouping motion vectors of input macroblocks whose types are equal to the type of the output macroblock, and wherein selecting two or more reference vectors comprises:

selecting the first reference vector by using a spatial weight and a block activity, the spatial weight being related to an overlapping region where the input macroblocks overlap with the correlation region correlated to the output macroblock, and the block activity being related to a number of non-zero DCT coefficients; and selecting the second reference vector, among the group of the candidate motion vectors excluding the first reference vector, by using the spatial weight and the block activity.

2. The method of claim 1, wherein the spatial weight is related to the number of pixels in the overlapping region where the input macroblocks overlap with the correlation region correlated with the output macroblock.

3. The method of claim 2, wherein the block activity is substantially proportional to the number of the non-zero DCT coefficients in the input macroblocks.

4. The method of claim 3, wherein the first reference vector is a first candidate motion vector from the group of the candidate motion vectors, the first candidate motion vector minimizing a sum of products of the spatial weight, the block activity and each distance between the first candidate motion vector in the group of the candidate motion vectors and each of the other candidate motion vectors in the group of the candidate motion vectors excluding the first candidate motion vector, the spatial weight corresponding to the first candidate motion vector, the block activity corresponding to the first candidate motion vector, and wherein the second reference vector is a second candidate motion vector from the group of the candidate motion vectors excluding the first reference vector, the second candidate motion vector minimizing a sum of products of the spatial weight, the block activity and each distance between the second candidate motion vector in the group of the candidate motion vector excluding the first reference vector and each of the other candidate motion vectors in the candidate motion vectors group excluding the first reference vector and the second candidate motion vector, the spatial weight corresponding to the second candidate motion vector, and the block activity corresponding to the second candidate motion vector.

5. The method of claim 3, wherein the first reference vector is $MV_i$ which minimizes $d_i$ in the following Equation 1, and the second reference vector represents another $MV_i$ among the candidate motion vectors excluding the first reference vector, which minimizes $d_i$ in the following Equation 1, wherein the Equation 1 is $$d_i = \sum_{j=1, j\neq i}^{N} M_i \times A_i \times \|MV_i - MV_j\|, \quad <\text{Equation 1}>$$

and wherein N denotes the number of the candidate motion vectors; $M_i$ and $M_j$ spatial weights; $A_i$ and $A_j$ denote the block activities; $MV_i$; and $MV_j$ denote motion vectors belonging to the group of the candidate motion vectors.

6. The method of claim 5, wherein the relativity is substantially proportional to a distance between the first reference vector and the second reference vector.

7. The method of claim 6, wherein the relativity is represented as R in the following Equation 2

$$R = \|MV_f - MV_s\|/2 \quad <\text{Equation 2}>$$

and wherein R denotes the relativity, $MV_f$ denotes the first reference vector, $MV_s$, denotes the second reference vector.

8. The method of claim 7, wherein the variably establishing a search window comprises:
establishing the narrower search window for the smaller relativity due to the decreasing distance between the first reference vector and the second reference vector; and
establishing the wider search window for the larger relativity due to the increasing distance between the first reference vector and the second reference vector.

9. The method of claim 8, wherein the variably establishing the search window comprises:
establishing the search window within a one-pixel perimeter around a first pixel corresponding to the first reference vector when the relativity is zero;
establishing the search window within a one-pixel perimeter around a second pixel when the relativity is larger than zero and smaller than two, the second pixel corresponding to one of the first and second reference vectors that has a smaller sum of absolute differences between a reference frame and one of the first and second reference vectors; and
establishing the search window within a two-pixel perimeter around a third pixel when the relativity is equal to or larger than two, the third pixel corresponding to one of the first and second reference vectors that has a smaller sum of absolute differences between a reference frame and one of the first and second reference vectors.

10. The method of claim 9, wherein the transcoding comprises conversion of High Definition TV format data into Standard Definition TV format data.

11. A transcoder comprising:
a decoder for decoding an input stream that is encoded as a first format;
a downsampler for downsampling an output of the decoder;
an encoder for encoding an output of the downsampler as a second format to generate an output stream;
an information extractor configured to extract information from the decoder, the information including types of input macroblocks, input motion vector information, Discrete Cosine Transform (DCT) coefficients information, and information of an overlapping region where the input macroblocks overlap with a correlation region correlated to an output macroblock; and
an encoding parameter estimator configured to:
establish a group of candidate motion vectors by using an output macroblock type and the information extracted by the information extractor;
select two or more reference vectors from the group of the candidate motion vectors;
variably establish a search window that varies according to a relativity of the reference vectors; and
estimate an output motion vector by performing a motion vector refinement on the search window,
wherein the group of the candidate motion vectors is generated by grouping the motion vectors of the input macroblocks whose types are equal to the type of the output macroblock,
wherein the reference vectors are composed of a first reference vector and a second reference vector,
wherein the encoding parameter estimator selects the first reference vector, among the group of the candidate motion vectors, by using a spatial weight and a block activity, the spatial weight being related to the overlapping region where the input macroblocks overlap with the correlation region correlated to the output macroblock, and the block activity being related to a number of non-zero Discrete Cosine Transform (DCT) coefficients,
wherein the encoding parameter estimator selects the second reference vector, among the group of the candidate motion vectors excluding the first reference vector, by using the spatial weight and the block activity; and
wherein the decoder, the downsampler, the encoder, the information extractor and the encoding parameter estimator are implemented by a computer running computer software or by hardware.

12. The transcoder of claim 11, wherein the spatial weight is related to the number of pixels in the overlapping region where the input macroblocks overlap with the correlation region correlated with the output macroblock.

13. The transcoder of claim 12, wherein the relativity is substantially proportional to the number of the non-zero DCT coefficients.

14. The transcoder of claim 13, wherein the first reference vector is a first candidate motion vector from the group of the candidate motion vectors, the first candidate motion vector minimizing a sum of products of the spatial weight and the block activity and each distance between the first candidate motion vector in the group of the candidate motion vectors and each of the other candidate motion vectors in the group of the candidate motion vectors excluding the first candidate motion vector, the spatial weight corresponding to the first candidate motion vector, and block activity corresponding to the first candidate motion vector, and wherein the second reference vector is a second candidate motion vector from the group of the candidate motion vectors excluding the first reference vector, the second candidate motion vector minimizing a sum of products of spatial weight, the block activity and each distance between the second candidate motion vector in the group of the candidate motion vectors excluding the first reference vector and each of the other candidate motion vectors in the group of the candidate motion vectors excluding the first reference vector and the second candidate motion vector, the spatial weight corresponding to the second candidate motion vector, and block activity corresponding to the second candidate motion vector.

15. The transcoder of claim 13, wherein the first reference vector is $MV_i$, which minimizes $d_i$, in the Equation 1, and the second reference vector is another $MV_i$, that minimizes $d_i$ in the Equation 1, the another $MV_i$ is selected among the candidate motion vectors excluding the first reference vector.

16. The transcoder of claim 14, wherein the relativity is substantially proportional to a distance between the first reference vector and the second reference vector.

17. The transcoder of claim 16, wherein the relativity is represented as R in the Equation 2.

18. The transcoder of claim 17, wherein the search window is established more narrowly with respect to the smaller relativity due to a decreasing distance between the first reference vector and the second reference vector, and wherein the search window is established more widely with respect to the larger relativity due to an increasing distance between the first reference vector and the second reference vector.

19. The transcoder of claim 18, wherein the search window is established within a one-pixel perimeter around a first pixel corresponding to the first reference vector, when the relativity is zero, wherein the search window is established within a one-pixel perimeter around a second pixel corresponding to one of the first and second reference vectors that has a smaller sum of absolute differences between a reference frame and one of the reference vectors, when the relativity is larger than zero and smaller than two, and wherein the search window is established within a two-pixel perimeter around a third pixel corresponding to one of the first and second reference vectors that has a smaller sum of absolute differences between a reference frame and one of the reference vectors, when the relativity is equal to or larger than two.

20. The transcoder of claim 19, wherein the first format is a High Definition TV format and the second format is a Standard Definition TV format.

* * * * *